United States Patent
Watanabe et al.

(10) Patent No.: US 8,140,222 B2
(45) Date of Patent: Mar. 20, 2012

(54) ELECTRIC POWER STEERING SYSTEM

(75) Inventors: Daiji Watanabe, Chiryu (JP); Tomoyuki Hori, Handa (JP); Motoaki Kataoka, Kariya (JP); Shuji Kuramitsu, Kariya (JP); Takehito Fujii, Anjo (JP)

(73) Assignee: Denso Corporation, Kariya (JP)

( * ) Notice: Subject to any disclaimer, the term of this patent is extended or adjusted under 35 U.S.C. 154(b) by 755 days.

(21) Appl. No.: 12/286,725

(22) Filed: Oct. 1, 2008

(65) Prior Publication Data

US 2009/0099731 A1 Apr. 16, 2009

(30) Foreign Application Priority Data

Oct. 15, 2007 (JP) ................................ 2007-268331

(51) Int. Cl.
- *G05D 1/00* (2006.01)
- *G01L 3/00* (2006.01)
- *B62D 5/04* (2006.01)

(52) U.S. Cl. ...................... 701/41; 73/862.325; 180/446

(58) Field of Classification Search .............. 701/41–46; 180/6.44–6.6, 6.2, 6.24, 9.38, 9.44, 12, 23, 180/22, 37, 234, 240, 280, 78, 402, 410, 180/419, 421, 426, 428, 431, 440, 436, 435; 475/18–19; 477/1; 73/117.02, 862.193, 73/862.325, 862.321, 814; 74/388 PS, 473.31, 74/484 R, 492

See application file for complete search history.

(56) References Cited

U.S. PATENT DOCUMENTS

| | | | | |
|---|---|---|---|---|
| 4,946,001 A | * | 8/1990 | Taniguchi et al. ............. | 180/446 |
| 5,473,539 A | * | 12/1995 | Shimizu et al. ................. | 701/41 |
| 6,543,571 B2 | | 4/2003 | Tokumoto | |
| 6,691,820 B2 | | 2/2004 | Tokumoto | |
| 6,883,637 B2 | * | 4/2005 | Nishizaki et al. ............. | 180/446 |
| 2003/0052639 A1 | | 3/2003 | Tanaka et al. | |
| 2005/0067214 A1 | | 3/2005 | Tanaka et al. | |
| 2005/0103561 A1 | | 5/2005 | Endo et al. | |
| 2009/0192679 A1 | | 7/2009 | Kobayashi et al. | |

FOREIGN PATENT DOCUMENTS

| | | | |
|---|---|---|---|
| CN | 1365207 | * | 1/2001 |
| EP | 1 470 987 | | 10/2004 |
| EP | 1 291 262 | | 7/2009 |

(Continued)

OTHER PUBLICATIONS

Extended Search Report dated Dec. 17, 2009 in corresponding European Application No. 08017409.7.

(Continued)

*Primary Examiner* — James Trammell
*Assistant Examiner* — Muhammad Shafi
(74) *Attorney, Agent, or Firm* — Harness, Dickey & Pierce, PLC

(57) ABSTRACT

A control unit estimates reverse transfer torque transferred from tires to a steering wheel and calculates an assist gain based on the reverse transfer torque. The control unit calculates basic assist torque demand by multiplying torsion torque detected by a torque sensor by the assist gain. The control unit further calculates assist torque command by adding compensation for stabilization. Since the assist gain is determined based on the reverse transfer torque, actual assist torque is generated in accordance with the force transferred from the road surface. Thus, a driver can operate the steering wheel while feeling the force from the road surface.

7 Claims, 5 Drawing Sheets

FOREIGN PATENT DOCUMENTS

| | | | |
|---|---|---|---|
| JP | 405134707 | * | 6/1993 |
| JP | 10-264837 | | 10/1998 |
| JP | 2002-249063 | | 9/2002 |
| JP | 2005-219618 | | 8/2005 |
| JP | 2005-255081 | | 9/2005 |
| JP | 02005313701 | * | 11/2005 |
| JP | 2006-111225 | | 4/2006 |
| JP | 2006-193080 | | 7/2006 |
| JP | 2007-8293 | | 1/2007 |
| JP | 2007-084027 | | 4/2007 |

OTHER PUBLICATIONS

Office action dated Oct. 6, 2009 in corresponding Japanese Application No. 2007-268331.

* cited by examiner

ELECTRIC POWER STEERING SYSTEM

CROSS REFERENCE TO RELATED APPLICATION

The present application is based on and incorporates herein by reference whole contents of Japanese Patent Application No. 2007-268331 filed on Oct. 15, 2007.

FIELD OF THE INVENTION

The present invention relates to an electric power steering system and, more particularly, to control of assist torque generated by an electric motor.

BACKGROUND OF THE INVENTION

In an electric power steering system for a vehicle, as disclosed in JP 2002-249063A, a torque sensor is provided between an input shaft rotatable with a steering wheel and an output shaft such as a pinion shaft operatively coupled with tires. This torque sensor has a torsion bar, which connects the input shaft and the output shaft, and detects torque based on a twist angle of the torsion bar.

The system determines assist torque, which is to be generated by an electric motor, based on the torque detected by the torque sensor. A final assist torque is determined not only based on the detected torque but also various values of phase compensation, inertia compensation, damping control and return control. The phase compensation is for stabilizing a system by providing the detected torque signal with a phase lead. The inertia compensation is for compensating response delay caused by inertia of the motor and the like. The damping control is for improving convergence of the steering wheel. The return control is for improving steering operation at the time of returning the steering wheel.

The torque detected by the torque sensor and the above various compensations and controls do not reflect reverse transfer torque, which is transferred in reverse from road surface to the steering wheel through tires. As a result, steering operation feeling is not satisfactory.

SUMMARY OF THE INVENTION

It is therefore an object of the present invention to provide an electric power steering system, which generates assist torque in correspondence to both toque applied from a steering wheel and from road surface.

According to one aspect of the present invention, an electric power steering system for a vehicle comprises a torque sensor, a motor and a control unit. The torque sensor includes a torsion bar connecting an input shaft on a steering shaft side and an output shaft on a tire side, and for detecting torque applied to the torsion bar based on a twist angle of the torsion bar. The control unit controls the motor to generate the assist torque in correspondence to torque detected by the torque sensor. Further, the control unit determines reverse transfer torque transferred from the tire side to the steering wheel side, determines an assist gain based on the reverse transfer torque, and determines assist torque based on multiplication of the detected torque and the assist gain.

Preferably, the control unit includes disturbance observer that estimates the reverse transfer torque based on assist torque command, the detected torque and rotation speed of the motor. The disturbance observer has a cut-off frequency, which is set between a range of frequencies of the reverse transfer torque caused by reaction force generated when a steering wheel is operated and a range of frequencies of the reverse transfer torque caused when road condition is transferred to the tire.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
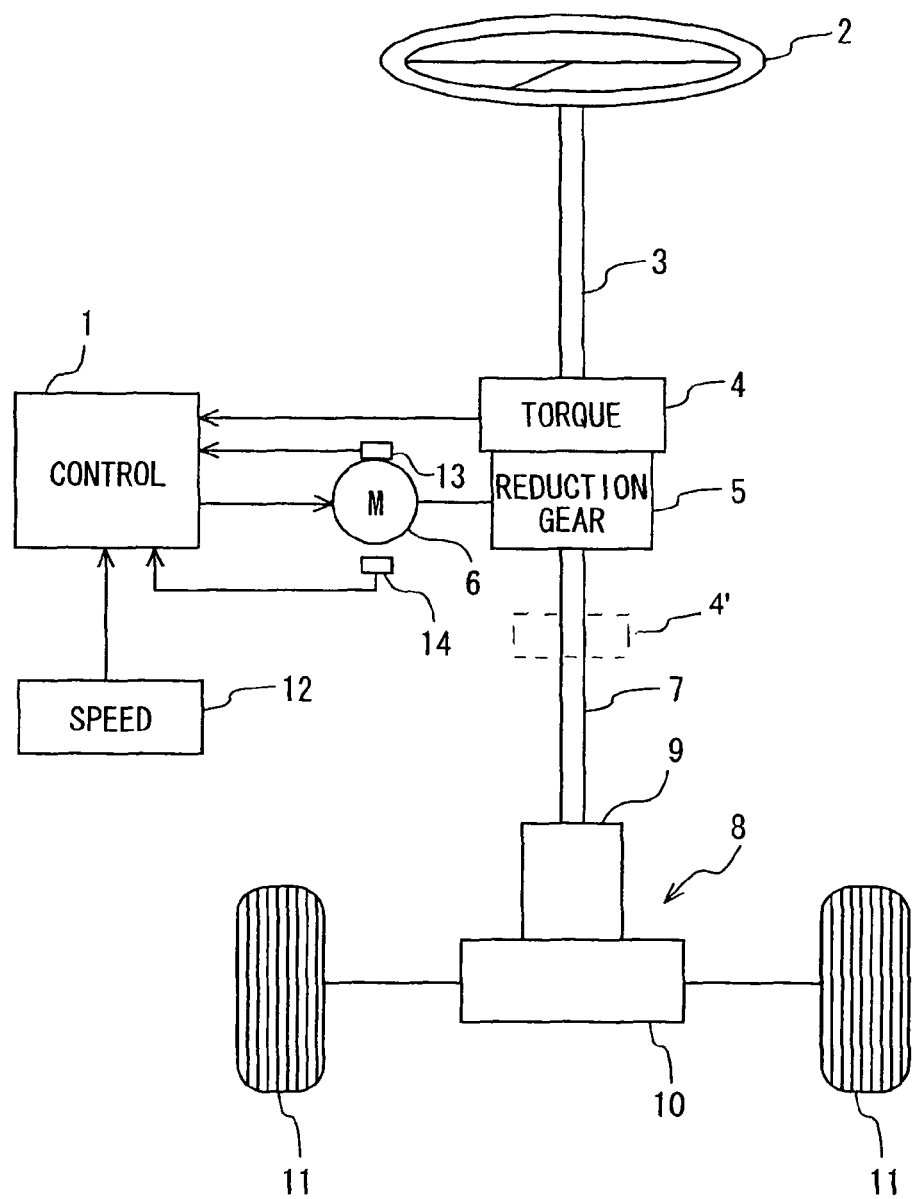
FIG. 1 is a schematic view showing an electric power steering system according to one embodiment of the present invention.

Referring first to FIG. 1, an electric power steering system (EPS) is provided for a vehicle.

In the vehicle, a steering wheel 2 is coupled to a steering shaft (input shaft) 3 to rotate the steering shaft 3. The steering shaft 3 is coupled to a reduction gear unit 5. The reduction gear unit 5 is coupled to an electric motor 13 to transfer motor rotation to the steering shaft 3 in reduced speed. The motor 6 is for generating steering assist torque to power-assist the steering operation of a driver.

A torque sensor 4 having a torsion bar is provided to connect the steering shaft 3 and an intermediate shaft (output shaft) 7 by its torsion bar. When the steering shaft 3 is rotated relative to the intermediate shaft 7, the torsion bar is twisted in correspondence to the rotation of the steering shaft 3. The torque sensor 4 has a sensing section, which detects twist of the torsion bar and produces a torque detection signal.

The intermediate shaft 7 is connected to a rack-and-pinion gear unit 8, which includes a pinion shaft (output shaft) 9 and a rack 10. The pinion 9 is connected to the intermediate shaft 7. The rack 10 is coupled to wheels of left and right tires 11 through tie rods and knuckle arms. When the rotational motion of the pinion 9 is converted into linear motion of the rack 10, the tires 11 are steered by an angle corresponding to the linear movement of the rack 10.

The electric power steering system includes a vehicle speed sensor 12, a rotation angle sensor 13 and a motor current sensor 14, which detect a vehicle speed V, a motor rotation angle θc and a motor current, and produces respective detection signals. These detection signals are applied to an electronic control unit 1. The torque (torsion torque) Ts detected by the torque sensor 4 is also applied to the control unit 1. The control unit 1 controls the motor 6 in response to the detection signals of the sensors 4, 12, 13 and 14.

The control unit 1 is a microcomputer and associated circuits, which perform all or a part of control processing of the system. The control unit 1 includes an assist gain generator 110 (means for determining an assist gain), a stabilization controller 120 (means for calculating a compensation for stabilizing the entire system), a damping controller 130, a torque high pass filter (HPF) 132, a multiplier 150 and adders 152, 154, and calculates a command value of assist torque Ta*, which is to be generated by the motor 6 (means for determining an assist torque command).

The control unit 1 further includes a current converter 140 and a current controller 142. The current converter 140 converts the assist torque command Ta* to a current command based on a predetermined relation, which is stored in a data map form or defined as a mathematical formulas.

The current controller 142 includes a conventional motor drive circuit such as a bridge circuit of four MOS transistors, and feedback controls the motor current so that the actual motor current detected by the motor current sensor 13 attains a command value of the motor current of the current command converter 140. The motor current sensor 13 may detect current that flows in the motor 6 by detecting a voltage developed between both terminals of a current detection resistor provided between the motor drive circuit and the ground.

The assist command Ta* may be calculated and determined in the following manner.

The assist command Ta* is a sum of a basic assist torque demand Tb and a first compensation δT1 and a second compensation δT2. The basic assist torque demand Th is calculated by multiplying the torsion torque Ts by an assist gain Ka generated by the assist gain generator 110.

The assist gain generator 110 includes a neutral gain generator 111, a load disturbance observer 112, disturbance-dependent gain calculator 113 and an adder 114.

The neutral gain generator 111 sets a neutral gain Kn in correspondence to the vehicle speed V. This gain Kn is set to increase as the vehicle speed V decreases. This gain Kn is variable with the vehicle speed V, but is not variable with the torsion torque Ts indicating torque which a driver applies to the steering wheel 2. Therefore, this gain Kn is a basic gain set when the steering wheel is at the neutral position.

The observer 112 (means for determining reverse transfer torque) receives the torsion torque Ts, rotation angle θc of the motor 6 and the assist torque command Ta, and estimates the disturbance load $\check{T}$ by using the following equation (Eq. 1). The disturbance load is a torque, which the torque sensor 4 detects as a torque that becomes disturbance to the torque the driver applies to the steering wheel 2. This disturbance torque is typically a reverse transfer torque Tx applied in reverse to the torque sensor 4 from the tire side. This reverse transfer torque Tx includes not only reaction force of road surface generated when the steering wheel 2 is turned, but also torque generated by rotation of the tires 11 when the vehicle travels over irregular or bumpy road surface.

In the equation (Eq. 1), the cut-off frequency is set to a value, which separates a first range of frequency of the reverse transfer torque Tx caused by the road surface reaction when the steering wheel 2 is turned and a second range of frequency of the reverse transfer torque Tx caused by the irregular road surface. This cut-off frequency is set to about 5 Hz, for example. The reverse transfer torque Tx estimated by the observer 112 is mostly caused by the road reaction force when the steering wheel 2 is turned.

$$\check{T}=(Ta+Ts)/(\tau s+1)-s\theta c'/(\tau s+1) \quad\quad\text{(Eq. 1)}$$

Figure 3:
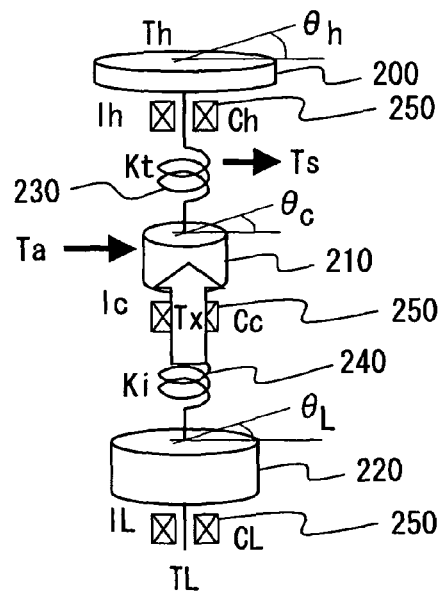
FIG. 3 is a diagrammatic view showing a power steering model.

This equation (Eq. 1) is derived by using a model shown in FIG. 3, which corresponds to the EPS shown in FIG. 1.

As shown in FIG. 3, the model includes a steering wheel part 200, a motor part 210 and a rack part 220. The steering wheel part 200 and the motor part 210 are coupled to each other by a spring 230 representing the torsion bar. The motor part 210 and the rack part 220 are coupled to each other by a spring 240 representing the intermediate shaft 7. Numeral 250 represents frictional resistance caused by rotation.

In this model, T, K, I, C, θ, h, c, L, and i represents torque, torsion spring constant, inertia, rotational friction coefficient, rotation angle, steering wheel part 200, motor part 210, rack part 220 and intermediate shaft 7, respectively. Ta and Ts represent assist torque and torsion torque, respectively. From this model in FIG. 3, the following equations Eq. 2 to Eq. 4 are established.

$$Ih\theta h''=Th-Ch\theta h'-Kt(\theta h'-\theta c) \quad\quad\text{(Eq. 2)}$$

$$Ih\theta c''=Ta+Kt(\theta h-\theta c)-Cc\theta c'-Ki(\theta c-\theta L) \quad\quad\text{(Eq. 3)}$$

$$I_L\theta L''=Ki(\theta c-\theta_L)-CL\theta_L'-T_L \quad\quad\text{(Eq. 4)}$$

In the model shown in FIG. 3, the reverse transfer torque Tx, which is transferred from the tire side to the torsion bar, is calculated by adding viscous friction torque of the motor part 210 to intermediate torque applied to the spring 240 representing the intermediate shaft 7. Therefore, the reverse transfer torque Tx is calculated by the following equation Eq. 5.

$$Tx=Ki(\theta c-\theta L)-Cc\theta c' \quad\quad\text{(Eq. 5)}$$

The equation Eq. 5 is transformed into the following equation Eq. 6 by using the equation Eq. 3.

$$Tx=Ta+Kt(\theta h-\theta c)-Ic\theta c'' \quad\quad\text{(Eq. 6)}$$

In the equation Eq. 6, the second term in the right side is the torsion torque Ts. Therefore, the reverse transfer torque Tx can be estimated from the assist torque Ta, torsion torque Ts and the motor rotation angle θc.

By subjecting the equation Eq. 6 to low pass filtering of $1/(\tau s+1)$ for noise removal, the following equation Eq. 7 is derived. The above equation Eq. 1 is derived by transforming the equation Eq. 7.

$$\check{T}=(Ta+Ts-Ic\theta c'')/(\tau s+1) \quad\quad\text{(Eq. 7)}$$

Figure 2:
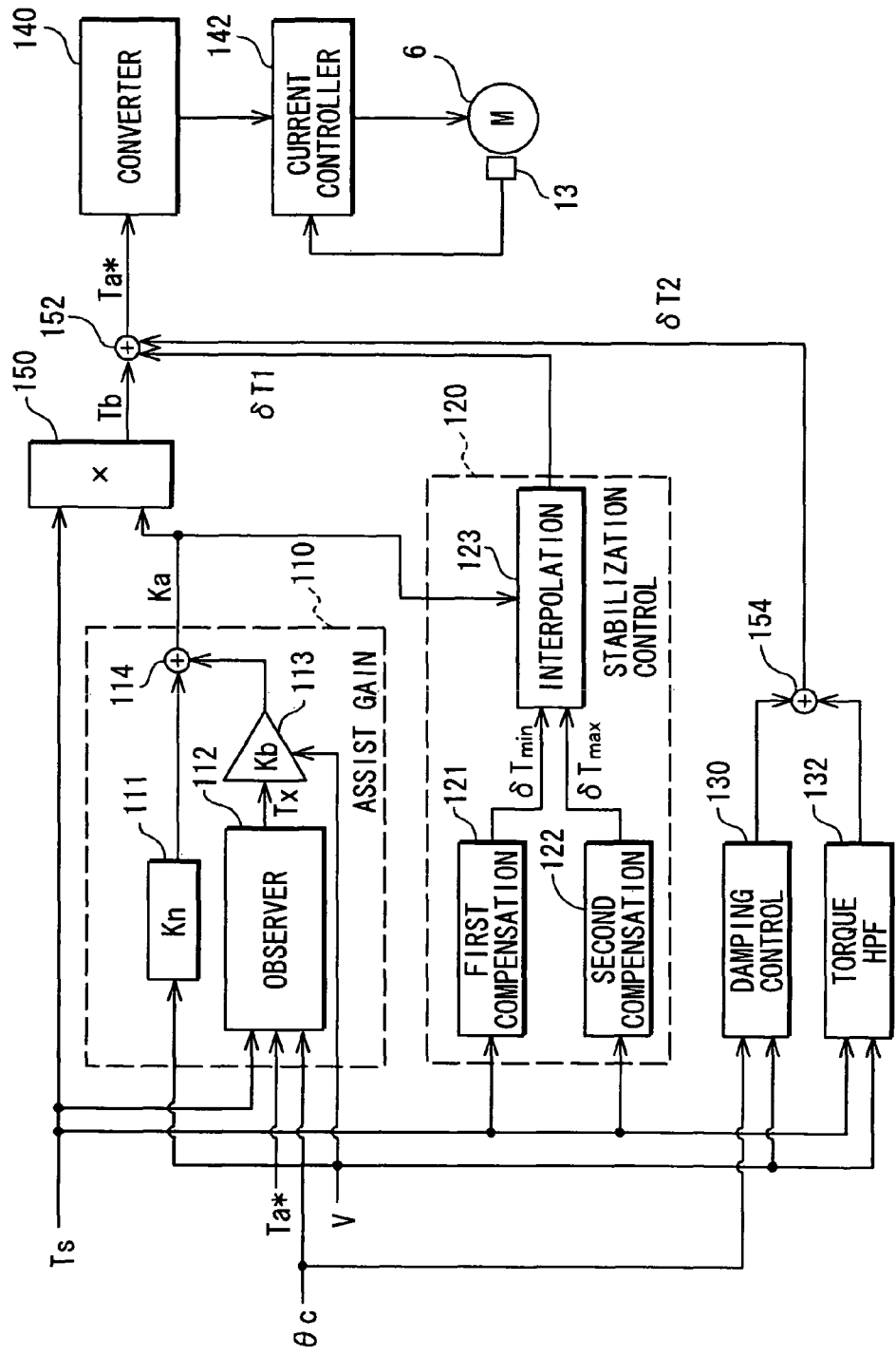
FIG. 2 is a block diagram showing a control unit in the embodiment.

Returning to FIG. 2, a gain calculator 113 variably sets a build gain Kb in accordance with the vehicle speed V, and multiplies the reverse transfer torque Tx estimated by the observer 112 by the build gain Kb. The build gain Kb is increased as the vehicle speed is decreased.

An adder 114 calculates the assist gain Ka by adding the value (Kb×Tx) calculated by the gain calculator 113 to the neutral gain Kn set by the neutral gain part 111. This assist gain Ka is applied to the multiplier 150 and a linear interpolator 123 of the stabilization controller 120.

The multiplier 150 calculates a demand of the basic assist torque Th by multiplying the torsion torque Ts by the assist gain Ka. Since the basic assist torque demand Th is adjusted by only adjusting two gains (neutral gain Kn and build gain Kb). Therefore, the steering operation feeling, which a vehicle driver will experience, can be adjusted easily.

Figure 4:
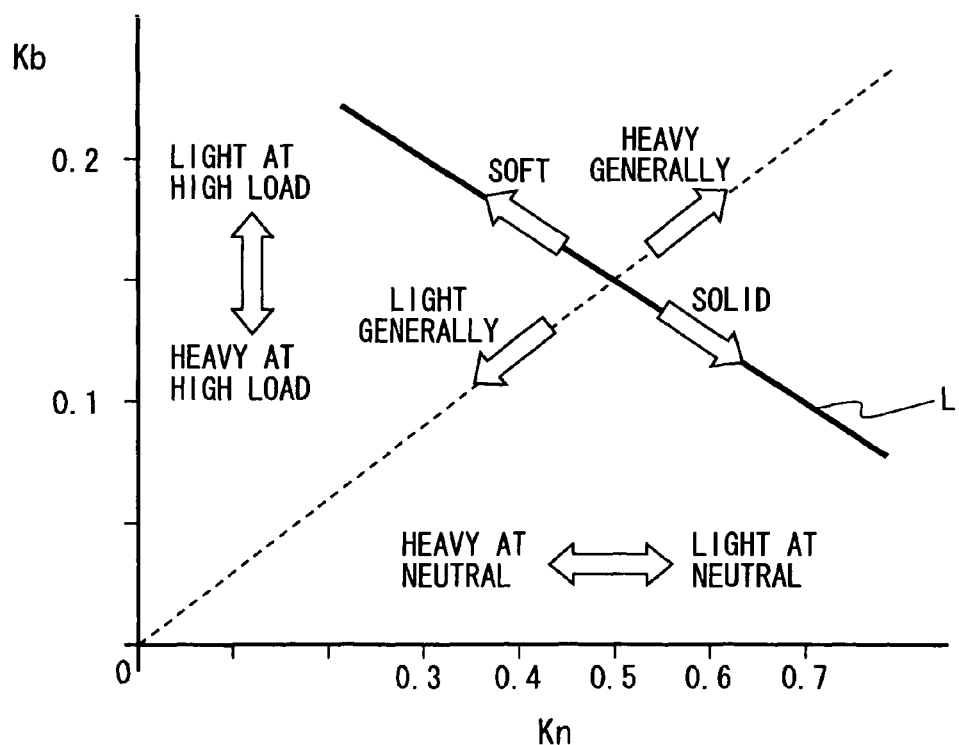
FIG. 4 is a graph showing a relation among a neutral gain, build gain and steering feeling in the embodiment.

The relation among the neutral gain Kn, build gain Kb and the steering operation feeling are illustrated in FIG. 4. The steering operation feeling is represented by arrows. This example is representative of a case of vehicle speed of about 30 to 40 Km/h.

As understood from FIG. 4, N-feeling indicated by arrows can be adjusted by varying the neutral gain Kn. The N-feeling is a degree of feeling in turning the steering wheel 2 when the steering wheel is at the neutral position. Further, the steering operation feeling at high load condition, in which the steering wheel 2 is turned much, can be adjusted by varying the build gain Kb.

Line L in FIG. 4 is an optimum characteristic line, which indicates the relation between the gains Kn and Kb for the best steering operation feeling. This line L is determined empirically.

Figure 5:
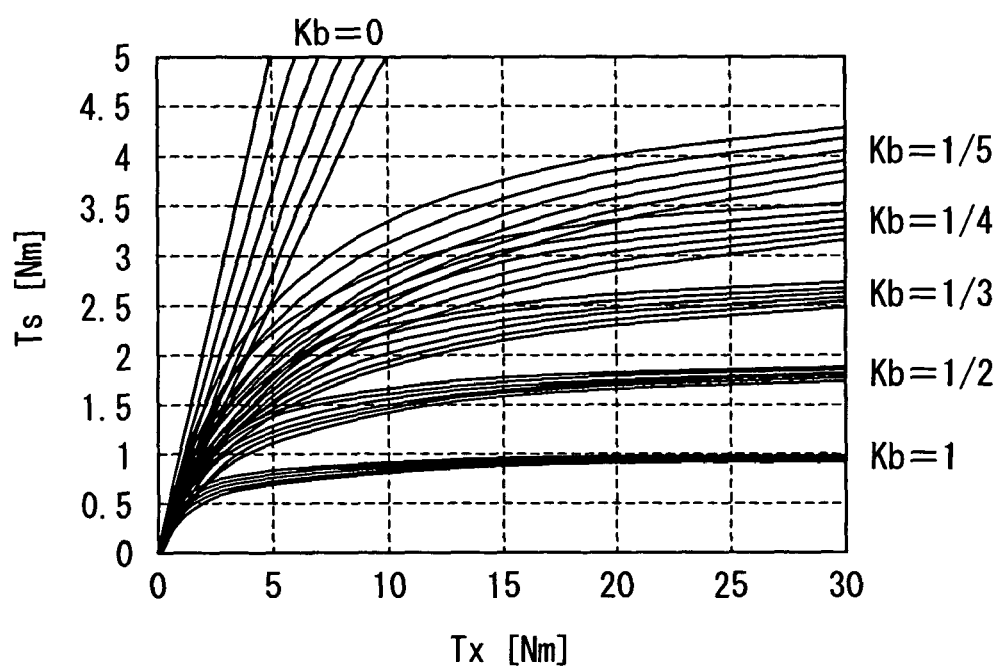
FIG. 5 is a graph showing a relation between reverse transfer torque and torsion torque, assuming that the neutral gain is 0 to 1 and the build gain is varied.

The relation between the reverse transfer torque Tx and the torsion torque Ts are analyzed as shown in FIG. 5 by setting the neutral gain Kn between 0 and 1 and varying the build gain Kb. It is also understood from this analysis that the steering operation feeling can be adjusted by the neutral gain Kn and the build gain Kb.

It is also understood from FIG. 5 that, irrespective of values of the build gain Kb, the torsion torque Ts also increases as the reverse transfer torque Tx increases. The reverse transfer torque Tx is mostly representative of the reaction force of the road surface generated when the steering wheel is turned. This reaction force increases as the steering wheel 2 is turned progressively. Therefore, the steering operation feeling becomes heavier as the steering operation angle increases from the neutral position.

Referring to FIG. 2 again, the adder 152 adds the first compensation δT1 and the second compensation δT2 to the basic assist torque demand Th to calculate the assist torque demand Ta*. The first compensation δT1 is calculated by the stabilization controller 120.

This stabilization controller 120 is configured to change its characteristics in accordance with the assist gain Ka. This is for the reason that the resonance characteristics of a control system, which receives the torque applied to the steering wheel 2 by the driver and outputs the corresponding torsion torque Ts, varies with changes in the assist gain Ka.

The stabilization controller 120 determines the first compensation δT1 in response to the torsion torque Ts based on one characteristic determined by the assist gain Ka. The Bode diagram shown in FIG. 6A indicates the resonance characteristics, which are exhibited when the system is controlled by directly using the basic assist torque demand Th as the assist torque command Ta* without any compensation or correction. The characteristic curves vary one another as the assist gains Ka are different.

Figure 6A:
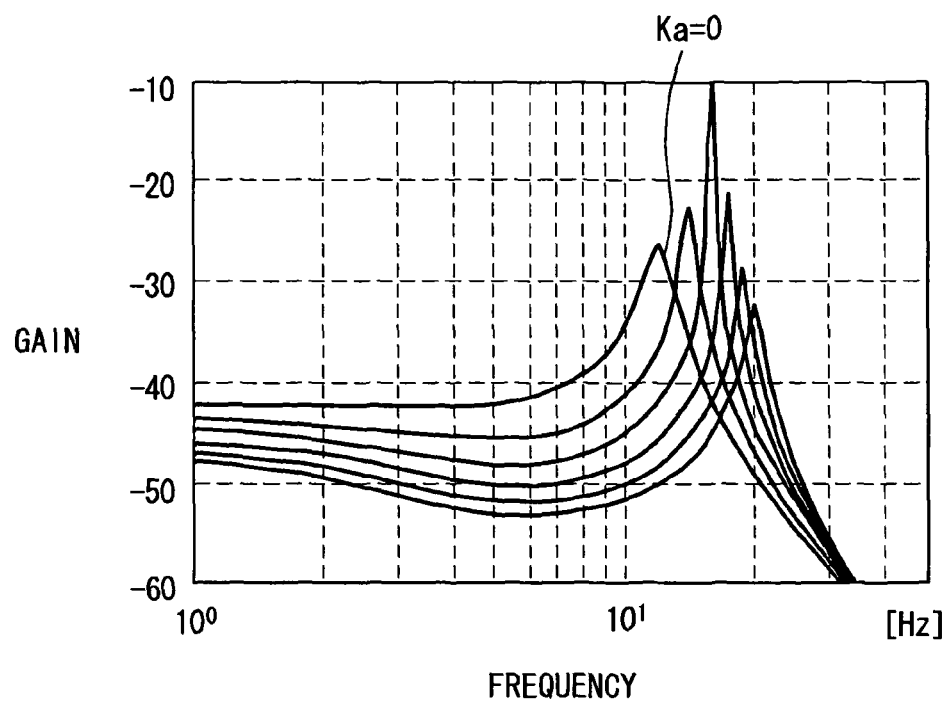
FIG. 6A is a Bode diagram showing control results when a basic assist torque demand is used as an assist command.

This FIG. 6A thus shows that the resonance characteristics of the control system vary with the assist gains Ka. From FIG. 6A, it is understood that the resonance frequency at which the gain attains a maximum peak increases as the assist gain Ka increases.

The stabilization controller 120 has a first compensation part 121, a second compensation part 122 and a linear interpolation part 123. The first compensation part 121 has a first predetermined transfer function (Gmin(z)) to stabilize the system assuming that the assist gain Ka is zero (minimum). The first compensation part 121 receives the torsion torque Ts and calculates a minimum compensation value δTmin based on the following equation Eq. 8.

$$\delta T\mathrm{min} = G\mathrm{min}(z) \times Ts \qquad (\text{Eq. 8})$$

The second compensation part 122 has a second predetermined transfer function (Gmax (z)) to stabilize the system assuming that the assist gain Ka is maximum Kmax. The maximum gain Kmax is determined empirically. The second compensation part 122 also receives the torsion torque Ts and calculates a maximum compensation value $\delta T_{max}$ based on the following equation Eq. 9.

$$\delta T\mathrm{max} = G\mathrm{max}(z) \times Ts \qquad (\text{Eq. 9})$$

The linear interpolation part 123 calculates the first compensation value δT1 in correspondence to the assist gain Ka by linearly interpolating the two compensation values δTmin and δTmax. Specifically, the first compensation value δT1 is calculated based on the following equation Eq. 10.

$$\delta T1 = (K\mathrm{max} - Ka)\delta T\mathrm{min}/k\mathrm{max} + Ka\delta T\mathrm{max}/K\mathrm{max} \qquad (\text{Eq. 10})$$

Figure 6B:
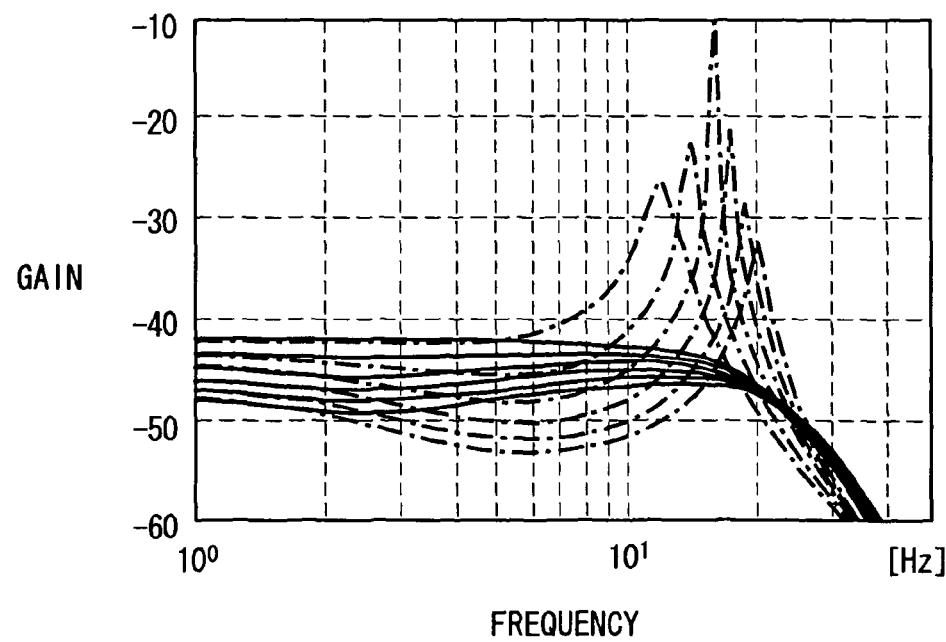
FIG. 6B is a Bode diagram showing control results when a sum of a basic assist torque demand and a first compensation is used as an assist command.

In the Bode diagram shown in FIG. 6B, characteristics indicated by the dot-chain lines correspond to the resonance characteristics indicated by the solid lines in FIG. 6A. In FIG. 6B, the solid lines indicate resonance characteristics produced when the control is performed by using the assist torque demand Ta*, which is a sum of the basic assist demand Th and the first compensation δT1 determined by the stabilization controller 120.

It is understood from FIG. 6B that the stabilization controller 120 effectively stabilizes the control system irrespective of the assist gain Ka. Specifically, irrespective of the angle of turning the steering wheel 2, the response characteristics of the torsion torque Ts relative to the input steering operation become more uniform. As a result, the driver can easily grasp the behavior of the vehicle in the steering operation.

Therefore, good steering operation feeling can be provided by using the assist command Ta* by adding the first compensation value δT1 to the basic assist torque demand value Th. In the present embodiment, the second compensation value δT2 is also used to improve the steering operation feeling.

The second compensation value δT2 is determined by adding a compensation calculated by the damping controller 130 and a compensation calculated by the torque high pass filter 132 by the adder 154.

The damping controller 130 provides compensation for improving convergence of the operation of the steering wheel 2 and convergence of the yaw angle of the vehicle. The torque high pass filter 132 provides responsiveness of the initial stage of operating the steering wheel 2 and compensation for suppressing disturbance.

The damping controller 130 and the torque high pass filter 132 are of known configuration. Specifically, the damping controller 130 receives the vehicle speed V and the rotation angle θc of the motor 6, calculates the speed of change of the relative angle in the steered angle from the change in the rotation angle θc and calculates a compensation value for braking the motor 6 based on the vehicle speed and the calculated change speed of the relative angle.

The torque high pass filter 132 receives the torsion torque Ts and the vehicle speed V, and calculates a compensation to improve the initial stage operation response feeling and suppress the disturbance.

The compensation calculated by the damping controller 130 and the torque high pass filter 132 are added by the adder 154, thus determining the second compensation value δT2. The first compensation value δT1 and the second compensation value δT2 are added to the basic assist torque demand value Th by the adder 152. The resulting value is applied to the current command value converter 140 as the assist torque command Ta*. The current controller 142 feedback-controls the current of the motor 6 to attain the motor current, which corresponds to the assist torque command Ta*.

In the above embodiment, the assist torque Ta generated by the motor 6 is varied in accordance with the reverse transfer torque Tx, which is transferred from the road surface side to the steering wheel side. Therefore, the driver can operate the steering wheel 2 by feeling the force transferred from the road surface.

The cut-off frequency of the disturbance observer 112 is set to about 5 Hz, the assist torque Ta is not so responsive to the reverse transfer torque Tx caused by the transfer of the road surface condition to the tires. The reverse transfer torque Tx caused by the transfer of the road surface condition to the tires are mostly transferred to the steering wheel 2, the driver can feel the road surface condition through the steering wheel.

The present invention is not limited to the above embodiment but may be implemented in many other ways.

For example, the assist torque command value Ta* may be determined by adding the first compensation value δT1 to the basic assist torque demand value Th without adding the second compensation value δT2.

The cur-off frequency of the load disturbance observer 112 may be raised up to about 10 Hz.

The reverse transfer torque Tx may be detected by a second torque sensor 4' (means for determining reverse transfer torque), which is provided in the force transfer path from the torque sensor 4 to the tires 11 separately from the torque sensor 4, to actually detect the reverse transfer torque in place of estimating the reverse transfer torque by the disturbance observer 112.

The EPS may be any types including a column type, a rack assist type or the like.

What is claimed is:

1. An electric power steering system for a vehicle comprising:
    a torque sensor including a torsion bar connecting an input shaft on a steering shaft side and an output shaft on a tire side, the torque sensor detecting torque applied to the torsion bar based on a twist angle of the torsion bar;
    a motor generating assist torque; and
    a control unit controlling the motor to generate the assist torque in correspondence to the torque detected by the torque sensor, wherein the control unit includes
    means for determining reverse transfer torque transferred from the tire side to the steering wheel side,
    means for determining an assist gain based on the reverse transfer torque, and
    means for determining an assist torque command based on multiplication of the detected torque and the assist gain.

2. The electric power steering system according to claim 1, wherein:
    means for determining the reverse transfer torque includes a disturbance observer that estimates the reverse transfer torque based on the assist torque command, the detected torque and rotation speed of the motor.

3. The electric power steering system according to claim 2, wherein:
    the disturbance observer has a cut-off frequency, which is set between a range of frequencies of the reverse transfer torque caused by reaction force generated when a steering wheel is operated and a range of frequencies of the reverse transfer torque caused when road condition is transferred to the tire.

4. The electric power steering system according to claim 1, wherein:
    the means for determining the reverse transfer torque includes a torque sensing device provided in a power transfer path from the torque sensor to the tire.

5. The electric power steering system according to claim 1, wherein:
    the means for determining the assist gain determines the assist gain by adding a multiplication result, which is a result of multiplication of the reverse transfer torque and a first gain that has influence on the reverse transfer torque, and a second gain that has no influence on the reverse transfer torque.

6. The electric power steering system according to claim 1, wherein the control unit further includes:
    means for calculating, based on the detected torque, a compensation for stabilizing an entire system including the torque detected by the torque sensor in response to torque applied to the steering wheel and the rotation speed of the motor,
    the assist torque is determined based on both the multiplication of the detected torque and the assist gain and the compensation of the calculating means, and
    the calculating means is configured to vary the compensation based on the assist gain.

7. The electric power steering system according to claim 6, wherein the calculating means includes:
    means for calculating the compensation as a minimum compensation, assuming that the assist gain is at a predetermined minimum value;
    means for calculating the compensation as a maximum compensation, assuming that the assist gain is at a predetermined maximum value;
    linear interpolating means for determining the compensation value in correspondence to assist gain determined by the means for determining the assist gain by linearly interpolation using the minimum compensation and the maximum compensation.

* * * * *